March 3, 1959  W. C. SAUER  2,875,569
BLADE MOUNTING MEANS FOR ROTARY DISC TYPE MOWER
Filed July 9, 1956

INVENTOR.
Wilbur C. Sauer
BY Clyde H. Haynes
his atty

United States Patent Office 2,875,569
Patented Mar. 3, 1959

2,875,569

BLADE MOUNTING MEANS FOR ROTARY DISC TYPE MOWER

Wilbur C. Sauer, Westlake, Ohio

Application July 9, 1956, Serial No. 596,753

6 Claims. (Cl. 56—295)

The present invention relates to the art of rotary type power lawn mowers or the like and in particular to the structure fastening the cutting blade to the rotary shaft of the motor.

In prior type rotary lawn mowers either a gasoline type or an electric motor have been mounted on a carriage with the shaft extending vertically. When a gasoline motor was used the crankshaft extended vertically through the motor and had a flywheel mounted on the top end and a cutter blade mounted on the bottom end for cutting the grass or the like. The blade was usually mounted on the shaft by means of a slip clutch which had to be carefully adjusted so that the blade would act as a flywheel for the motor and yet would not rotate with the shaft if the blade struck a stone or other similar object in the lawn.

It has been found that if the blade was loose on the shaft it did not provide the fly-wheel action necessary to make the motor run properly, and on the other hand if the blade was mounted too tight on the shaft the shaft was easily bent when the blade hit an object. In order to obtain sufficient weight for a fly-wheel action the blade was constructed of a relatively thick heavy material and had cutting edges ground on the leading ends thereof. Ususally the blade was mounted on the end of the shaft by means of a bolt extending through the blade, a plurality of friction clutch plates, some of which are of friction material, and into the center of the end of the shaft. This construction would hold the blade in proper alignment and in balance until the blade was ground to obtain new cutting edges, at which time the opposite ends of the blade were usually ground in an unbalanced manner, thus permitting the blade to wabble or to be unbalanced thereafter.

It was also discovered that under normal operations the bolt was threaded in such a direction that rotation of the blade by the shaft tended to tighten the bolt therein. If the shaft stopped rotating quickly when the motor was shut off, the centrifugal force of the blade tended to keep the blade rotating and thus loosen the bolt and permit the blade to become loose on the end of the shaft.

The present invention is directed to structure which will overcome many of these problems and the deficiencies in the prior constructions. The present structure prevents the damaging forces exerted on a blade when it hits an object being transmitted to the shaft. This is accomplished by making the blade of extremely thin flexible material which can flex easily and mounting it on a face plate, hub, or fly-wheel on the end of a shaft by means of a spring mounting. When the blade hits an obstruction it will flex and become disengaged from the fly-wheel like face plate without bending the shaft or disturbing the fly-wheel action of the face plate.

Therefore, one of the objects of the present invention is to provide a cutting blade and a structure for fastening the blade to the end of the crankshaft in such manner that the crankshaft will not be bent if the blade hits an object.

Another object of the invention is to provide a clutch between the cutting blade and a crankshaft which will become temporarily disengaged if the blade is suddenly deviated from its normal path of rotation and which will again become engaged when the blade returns to its normal path of rotation.

A further object of the invention is to provide the end of a crankshaft with a face plate and a spring or resilient clutch arrangement supporting and drivingly engaging the blade with the face plate in such manner that the blade does not act as a fly-wheel on the crankshaft.

A still further object of the invention is to provide the shaft of the motor with a face plate type fly-wheel and a relatively thin very light weight replaceable flexible blade operatively mounted on the face plate.

Further objects and a fuller understanding of the invention will become apparent from the attached drawings and claims when taken in conjunction with the following description of the invention.

The invention may take form in a rotary type lawn mower wherein a shaft, for example the crankshaft of a gasoline driven motor, or the rotary shaft of an electric motor, rotates a blade generally horizontal to the ground to cut grass, or other similar materials, or for mulching leaves or the like. The crankshaft and the blade have cooperating portions whereby the crankshaft normally rotates the blade in a path of rotation and whereby the shaft does not rotate the blade if it is deviated from the normal path of rotation. The blade is preferably constructed of a relatively thin very light weight material which is sufficiently flexible to permit the blade to be deviated from its normal path of rotation when it strikes an object other than the grass or the like, thereby preventing damaging of the shaft or bending of the shaft.

The cooperating association between the blade and the shaft may include a face plate or a fly-wheel acting member secured to the end of the shaft and serving as a fly-wheel for the motor with the blade being sufficiently light so that it has relatively no reaction on the fly-wheel actuation.

For purposes of illustration and description and not of limitation, a preferred embodiment of the invention is illustrated in the drawings in which.

Figure 1:
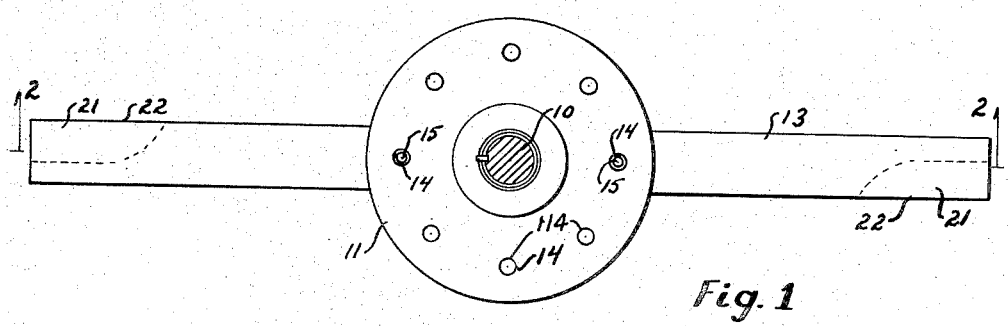
Figure 1 is a top view of the invention showing a blade mounted on the face plate.

In the rotary type lawn mower blade drive as illustrated, a crankshaft 10 is provided on the end thereof with a face plate 11 for rotational movement therewith, the rotational movement being provided by securely attaching the face plate 11 to the crankshaft by suitable means, for example the Woodruff key 12 as illustrated. The term face plate as used herein is meant to include blade supporting structures which may be secured to the shaft to support the blade in accordance with the present invention. The face plate may be of any desired shape for example a relatively flat disc shape as illustrated.

The face plate 11 rotatably drives a grass cutting blade 13, or the like, which normally rests against the face plate and extends diametrically across and radially outwardly therebeyond on opposite diametrical sides thereof. In this instance the face plate 11 is provided with at least a pair of diametrically opposite wall portions such as the wall portion 14 and the blade is provided with a protrusion 15 engageable with the wall portion 14 to impart rotary movement from the face plate to the blade. It is understood that if desired a plurality of wall portions defining recesses may be provided in the face plate in diametrically opposite spaced locations on a circle whose center is at the center of rotation of the face plate. In this particular instance the wall portions 14 are cylindrical and their defined recesses are in the form of ordinary cylindrical holes 114 drilled entirely through the face plate so that dirt, grass or the like will not fill the recess but will be pushed on through the hole if it gets in the vicinity of the wall portion or in the hole 114

The blade is normally held in engagement with the face plate by a resilient fastening which permits disengagement of the wall and protrusion, and axial separation of the face plate and blade when the blade is suddenly moved or deviated from its normal path of rotation. The blade's normal path of rotation is in a plane substantially transverse to the axis of the shaft. The spring or resilient mounting in this instance takes form in a coil pressure spring 17, a cap 18 for enclosing the spring 17 and a headed screw 19. When the blade is assembled to the face plate the headed screw 19 extends through the cap, the coil spring, the blade, the face plate, and is threaded coaxially into the end of the shaft with the coil spring between the blade and the head 20 of the screw 19.

In normal operation the blade rotates in a rotational path of movement which is substantially perpendicular to its axis of rotation or to the axis of rotation of the shaft 10 or face plate 11. The pressure spring 17 normally holds the blade against the face plate 11 and thus keeps the protrusions 15 in the recesses or holes 114 and against the wall portion 14 of the face plate 11. However if the blade 13 is deviated from this path of movement, either the blade flexes to permit the protrusions 15 to become disengaged from the wall portion 14 and/or the spring 17 permits such disengagement.

Figure 2:
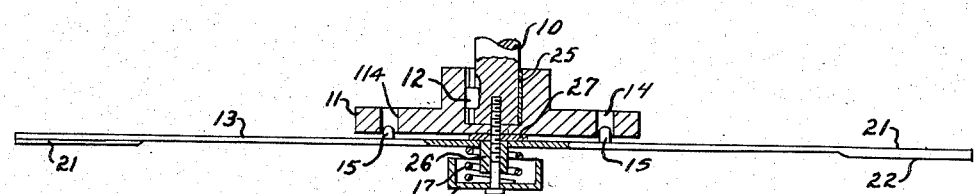
Figure 2 is a sectional view approximately along the line 2—2 and illustrating the parts in normal position for the blade to rotate in its normal path of rotation.
Figure 3:
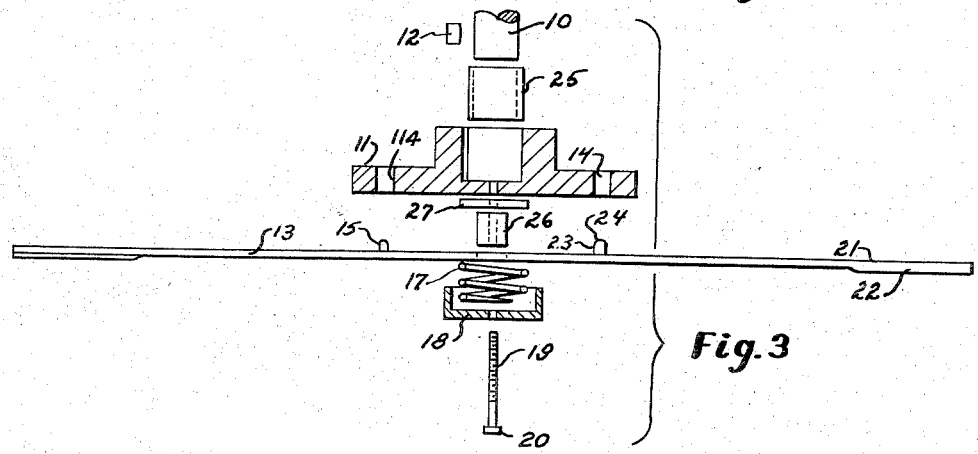
Figure 3 is an exploded view, partly in section, illustrating the parts of the invention.

Deviation of the blade from its normal path of rotation may be encouraged when the blade hits an object, which it will not cut readily, by constructing the blade of a relatively thin flexible material and providing it with end portions, such as the end portion 21, extending radially beyond the face plate and other than transverse to the axis of rotation thereof. This may be accomplished by bending the blade or having the leading edge or cutting edge 22 thereof tilted so that it is other than parallel to the rotational path of movement of the blade and preferably so that it is tilted with the leading edge furthest from the plane of the face plate. This causes the blade to be directed in a downward direction relative to the face plate and away from the face plate, or from the normal position illustrated in Figure 2 to a deviated position when the blade hits an object.

The engagement of the protrusions with the wall portion 14 is enhanced by providing the protrusion 15 with a surface 23 which is parallel to the axis of rotation of the shaft and by having the protrusion terminate in a tapered or rounded surface 24 which merges with the surface 23. During normal driving rotation of the blade by the face plate the surface 23 engages the wall portion 14.

The face plate 11, the blade 13, and the spring assembly therefore, may be adapted to various diameters of crankshafts by means of bushings, for example the bushings 25 and 26 illustrated in the drawings. The bushings 25 may be inserted in the face plate to provide a smaller shaft receiving hole therein when the face plate is to be inserted or fastened to a shaft of smaller than normal diameter and similarly the bushing 26 may be inserted in the hole in the blade through which the bolt or screw 19 extends when the hole in the blade 13 is larger than the diameter of the screw. This bushing 26 is illustrated as having a length greater than the thickness of the blade so that it will extend into the spring 17.

It is also understood that washers, such for example washer 27, may be placed about the screw 19 and between the blade 13 and the face plate 11 to control the amount of cooperative engagement between the protrusion 15 and the wall portion 14 of the hole 114 in the face plate. The protrusion will not extend as far into the hole 114 when a washer is inserted between the blade and the face plate.

Although the blade, the spring, and the face plate have been illustrated as being supported in operable relationship by extending the screw there through and into the end of the shaft it is understood that other fastening means may be used, for example, providing the shaft with a stud portion and using a nut on the end of the stud portion in place of the headed screw. In such instance the stud on the end of the crankshaft would extend through the bushings, the spring, the cap, and the face plate. Similarly other modifications, arrangements of parts, and details of construction will become apparent to those skilled in the art without departing from the spirit of the invention.

In normal operation the relatively thin flexible blade will be rotatably driven in its path of movement by the cooperation of the protrusions and the wall on the blade and face plate respectively, or vice versa. However when the blade hits an obstruction it will flex or curl up and thus be deviated from its normal path of rotation and thus be disengaged from the rotational movement of the face plate without bending the shaft or disturbing fly-wheel action of the hub or face plate, as was done by prior arrangements of the frictional clutch type. After the blade has passed the obstruction the resiliency of the blade or its spring properties and the coil spring or similar resilient member such as 17 will again urge the blade into driving engagement with the face plate whereupon the protrusion 15 will again engage the wall portion 14, or another similar wall 14 in the face plate.

The present structure prevents the damaging forces exerted on a blade when it hits an object from being transmitted to the shaft and bending the shaft. The resiliency and flexibility of the blade and spring help dampen or otherwise disperse these forces without allowing them to bend the shaft.

What is claimed is:

1. In a rotary type lawn mower, a drive shaft adapted to be rotated at a predetermined speed and having an end, fly-wheel means secured to and carried by said end of said shaft for rotation therewith at said predetermined speed, blade means adapted to cut grass extending diametrically across said fly-wheel means and rotatable at said predetermined speed by said fly-wheel means in a plane transverse to the axis of rotation of said shaft, one of said means having a plurality of diametrically spaced wall portions defining a plurality of diametrically spaced recesses in said one of said means, the other of said means having a plurality of diametrically spaced protrusions extending in said recesses and engageable, each respectively, with said wall portions to transmit rotary movement from said fly-wheel means to said blade means at said predetermined speed, and spring means interacting between said fly-wheel means and said blade means to normally hold said blade means in a position relative to said fly-wheel means in which said protrusions engage their respective wall portions while said blade means is rotated at said predetermined speed by said fly-wheel means, said spring means permitting disengagement of said wall portions with said protrusions and axial separation of said fly-wheel and blade means when said blade means strikes an object which retards rotation of and thereby suddenly deviates said blade means from its normal path of rotation to permit continued rotation of said fly-wheel at said predetermined speed while said blade is deviated from its normal path of rotation, and said spring means causing continued driving engagement from said fly-wheel means to said blade means after said blade means has deviated from its normal path of rotation and thereby causing re-engagement of said protrusions and said wall portions for continued rotation of said blade means by said fly-wheel means at said predetermined speed upon said blade means re-entering its normal path of rotation.

2. The structure as defined in claim 1 wherein said protrusions are on said blade means and said wall portions are on said fly-wheel means.

3. The structure as defined in claim 2 wherein said recesses and wall portions are disposed at evenly spaced intervals in a circular path concentric with the axis of rotation of said fly-wheel means and there are a pair of protrusions on said blade means aligned in said circular path and on diametrically opposite sides of said axis of rotation.

4. The structure as defined in claim 1 wherein a major portion of said blade is disposed in a plane perpendicular to the axis of rotation while said blade is normally rotated by said fly-wheel means, and wherein a major portion of said blade is removed from said plane when said blade is deviated from said normal path of rotation.

5. The structure of claim 1 wherein said spring means includes a headed member co-axially extending through said blade and fixed to said crankshaft and a coil spring about said member and between the head thereof and said blade.

6. The structure of claim 2 wherein each said wall portion is parallel to the axis of said shaft and each said protrusion has a surface parallel to the wall portion and terminating in a curved surface.

References Cited in the file of this patent

UNITED STATES PATENTS

| | | |
|---|---|---|
| 998,615 | Huneke | July 25, 1911 |
| 1,954,579 | Smith | Apr. 10, 1934 |
| 2,539,619 | Goodall | Jan. 30, 1951 |
| 2,592,755 | Soenksen | Apr. 15, 1952 |
| 2,643,502 | Flanigan | June 30, 1953 |
| 2,685,160 | Kuhary et al. | Aug. 3, 1954 |
| 2,687,607 | Sewell | Aug. 31, 1954 |
| 2,721,438 | O'Maley | Oct. 25, 1955 |
| 2,699,636 | Brown et al. | Jan. 18, 1955 |

FOREIGN PATENTS

| | | |
|---|---|---|
| 339,618 | Great Britain | Dec. 10, 1930 |